(12) United States Patent
Eshet (10) Patent No.: US 10,366,278 B2
(45) Date of Patent: Jul. 30, 2019

(54) CURVATURE-BASED FACE DETECTOR

(71) Applicant: APPLE INC., Cupertino, CA (US)

(72) Inventor: Yaron Eshet, Haifa (IL)

(73) Assignee: APPLE INC., Cupertino, CA (US)

( * ) Notice: Subject to any disclaimer, the term of this patent is extended or adjusted under 35 U.S.C. 154(b) by 142 days.

(21) Appl. No.: 15/592,228

(22) Filed: May 11, 2017

(65) Prior Publication Data

US 2018/0082109 A1 Mar. 22, 2018

Related U.S. Application Data

(60) Provisional application No. 62/396,839, filed on Sep. 20, 2016.

(51) Int. Cl.
| | | |
|---|---|---|
| *G06K 9/00* | (2006.01) | |
| *H04N 13/106* | (2018.01) | |
| *G01B 11/24* | (2006.01) | |
| *G01B 11/25* | (2006.01) | |
| *G06T 7/64* | (2017.01) | |
| *H04N 13/271* | (2018.01) | |
| *H04N 13/128* | (2018.01) | |
| *H04N 13/00* | (2018.01) | |

(52) U.S. Cl.
CPC .......... *G06K 9/00288* (2013.01); *G01B 11/24* (2013.01); *G01B 11/25* (2013.01); *G06K 9/00201* (2013.01); *G06K 9/00248* (2013.01); *G06K 9/00281* (2013.01); *G06T 7/64* (2017.01); *H04N 13/106* (2018.05); *H04N 13/128* (2018.05); *H04N 13/271* (2018.05); *G06T 2207/10028* (2013.01); *G06T 2207/30201* (2013.01); *H04N 2013/0081* (2013.01)

(58) Field of Classification Search
USPC ......... 1/1; 348/156; 382/103, 115, 117, 118, 382/190, 195, 278; 708/322
See application file for complete search history.

(56) References Cited

U.S. PATENT DOCUMENTS

| | | | |
|---|---|---|---|
| 5,081,689 A | | 1/1992 | Meyer et al. |
| 5,673,213 A | * | 9/1997 | Weigl ................. H03H 21/0012 |
| | | | 708/322 |
| 5,684,887 A | | 11/1997 | Lee et al. |
| 5,846,134 A | | 12/1998 | Latypov |

(Continued)

FOREIGN PATENT DOCUMENTS

| | | |
|---|---|---|
| JP | H03-029806 A | 2/1991 |
| JP | H10-235584 A | 9/1998 |

(Continued)

OTHER PUBLICATIONS

Hart, D., U.S. Appl. No. 09/616,606 filed Jul. 14, 2000.

(Continued)

*Primary Examiner* — Xuemei G Chen
(74) *Attorney, Agent, or Firm* — Kligler & Associates (57) ABSTRACT

A method for processing data includes receiving a depth map of a scene containing at least a humanoid head, the depth map comprising a matrix of pixels having respective pixel depth values. A digital processor extracts from the depth map a curvature map of the scene. The curvature map includes respective curvature values of at least some of the pixels in the matrix. The curvature values are processed in order to identify a face in the scene.

16 Claims, 6 Drawing Sheets

(56) References Cited

U.S. PATENT DOCUMENTS

| | | | |
|---|---|---|---|
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |
| 6,002,808 A | 12/1999 | Freeman | |
| 6,137,896 A * | 10/2000 | Chang | G06K 9/00208 382/118 |
| 6,176,782 B1 | 1/2001 | Lyons et al. | |
| 6,256,033 B1 | 7/2001 | Nguyen | |
| 6,518,966 B1 | 2/2003 | Nakagawa et al. | |
| 6,608,917 B1 | 8/2003 | Wei et al. | |
| 6,658,136 B1 | 12/2003 | Brumitt | |
| 6,681,031 B2 | 1/2004 | Cohen et al. | |
| 6,771,818 B1 | 8/2004 | Krumm et al. | |
| 6,856,314 B2 | 2/2005 | Ng | |
| 6,857,746 B2 | 2/2005 | Dyner | |
| 6,993,157 B1 | 1/2006 | Oue et al. | |
| 7,003,134 B1 | 2/2006 | Covell et al. | |
| 7,003,136 B1 | 2/2006 | Harville | |
| 7,013,046 B2 | 3/2006 | Kawamura et al. | |
| 7,042,440 B2 | 5/2006 | Pryor et al. | |
| 7,170,492 B2 | 1/2007 | Bell | |
| 7,215,815 B2 | 5/2007 | Honda | |
| 7,239,726 B2 * | 7/2007 | Li | G06K 9/00268 382/117 |
| 7,259,747 B2 | 8/2007 | Bell | |
| 7,302,099 B2 | 11/2007 | Zhang et al. | |
| 7,317,830 B1 | 1/2008 | Gordon et al. | |
| 7,340,077 B2 | 3/2008 | Gokturk | |
| 7,348,963 B2 | 3/2008 | Bell | |
| 7,428,542 B1 | 9/2008 | Fink et al. | |
| 7,536,032 B2 | 5/2009 | Bell | |
| 7,555,158 B2 | 6/2009 | Park et al. | |
| 7,580,572 B2 | 8/2009 | Bang et al. | |
| 7,583,275 B2 | 9/2009 | Neumann et al. | |
| 7,602,965 B2 | 10/2009 | Hong et al. | |
| 7,634,133 B2 | 12/2009 | Jerebko et al. | |
| 7,706,571 B2 | 4/2010 | Das et al. | |
| 7,925,077 B2 | 4/2011 | Woodfill et al. | |
| 7,974,443 B2 | 7/2011 | Kipman et al. | |
| 8,175,374 B2 | 8/2012 | Pinault et al. | |
| 8,249,334 B2 | 8/2012 | Berliner et al. | |
| 8,270,688 B2 | 9/2012 | Fan et al. | |
| 8,280,106 B2 | 10/2012 | Ma | |
| 8,280,165 B2 | 10/2012 | Meng et al. | |
| 8,320,621 B2 | 11/2012 | McEldowney | |
| 8,358,342 B2 | 1/2013 | Park | |
| 8,379,926 B2 | 2/2013 | Kanhere et al. | |
| 8,405,656 B2 | 3/2013 | El Dokor et al. | |
| 8,411,149 B2 | 4/2013 | Maison et al. | |
| 8,411,932 B2 | 4/2013 | Liu et al. | |
| 8,433,104 B2 | 4/2013 | Cheng | |
| 8,456,517 B2 | 6/2013 | Spektor et al. | |
| 8,503,720 B2 | 8/2013 | Shotton et al. | |
| 8,565,479 B2 | 10/2013 | Gurman et al. | |
| 8,660,318 B2 | 2/2014 | Komura et al. | |
| 8,660,362 B2 | 2/2014 | Katz et al. | |
| 8,675,933 B2 | 3/2014 | Wehnes et al. | |
| 9,002,099 B2 | 4/2015 | Litvak et al. | |
| 9,019,267 B2 | 4/2015 | Gurman | |
| 9,047,507 B2 | 6/2015 | Gurman et al. | |
| 9,076,205 B2 * | 7/2015 | Cho | G06T 7/13 |
| 9,159,140 B2 | 10/2015 | Hoof et al. | |
| 9,301,722 B1 | 4/2016 | Martinson | |
| 9,311,560 B2 | 4/2016 | Hoof et al. | |
| 9,317,741 B2 | 4/2016 | Guigues et al. | |
| 9,390,500 B1 | 7/2016 | Chang et al. | |
| 9,727,776 B2 * | 8/2017 | Dedhia | G06K 9/00268 |
| 9,898,651 B2 * | 2/2018 | Gurman | G06K 9/00362 |
| 2002/0071607 A1 | 6/2002 | Kawamura et al. | |
| 2003/0095698 A1 | 5/2003 | Kawano | |
| 2003/0113018 A1 | 6/2003 | Nefian et al. | |
| 2003/0147556 A1 * | 8/2003 | Gargesha | G06K 9/00268 382/190 |
| 2003/0156756 A1 | 8/2003 | Gokturk et al. | |
| 2003/0169906 A1 * | 9/2003 | Gokturk | G06K 9/00201 382/115 |
| 2003/0235341 A1 | 12/2003 | Gokturk et al. | |
| 2004/0091153 A1 | 5/2004 | Nakano et al. | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0258306 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0265583 A1 | 12/2005 | Covell et al. | |
| 2005/0271279 A1 | 12/2005 | Fujimura et al. | |
| 2006/0092138 A1 | 5/2006 | Kim et al. | |
| 2006/0115155 A1 | 6/2006 | Lui et al. | |
| 2006/0159344 A1 | 7/2006 | Shao et al. | |
| 2006/0165282 A1 | 7/2006 | Berretty et al. | |
| 2007/0003141 A1 | 1/2007 | Rittscher et al. | |
| 2007/0076016 A1 | 4/2007 | Agarwala et al. | |
| 2007/0154116 A1 | 7/2007 | Shieh | |
| 2007/0188490 A1 | 8/2007 | Kanai et al. | |
| 2007/0230789 A1 | 10/2007 | Chang et al. | |
| 2008/0123940 A1 | 5/2008 | Kundu et al. | |
| 2008/0226172 A1 | 9/2008 | Connell | |
| 2008/0236902 A1 | 10/2008 | Imaizumi | |
| 2008/0252596 A1 | 10/2008 | Bell et al. | |
| 2008/0260250 A1 | 10/2008 | Vardi | |
| 2008/0267458 A1 | 10/2008 | Laganiere et al. | |
| 2008/0310706 A1 | 12/2008 | Asatani et al. | |
| 2009/0009593 A1 | 1/2009 | Cameron et al. | |
| 2009/0027335 A1 | 1/2009 | Ye | |
| 2009/0035695 A1 | 2/2009 | Campestrini et al. | |
| 2009/0078473 A1 | 3/2009 | Overgard et al. | |
| 2009/0083622 A1 | 3/2009 | Chien et al. | |
| 2009/0096783 A1 | 4/2009 | Shpunt et al. | |
| 2009/0116728 A1 | 5/2009 | Agrawal et al. | |
| 2009/0183125 A1 | 7/2009 | Magal et al. | |
| 2009/0222388 A1 | 9/2009 | Hua et al. | |
| 2009/0297028 A1 | 12/2009 | De Haan | |
| 2010/0002936 A1 | 1/2010 | Khomo | |
| 2010/0007717 A1 | 1/2010 | Spektor et al. | |
| 2010/0034457 A1 | 2/2010 | Berliner et al. | |
| 2010/0111370 A1 | 5/2010 | Black et al. | |
| 2010/0235786 A1 | 9/2010 | Maizels et al. | |
| 2010/0302138 A1 | 12/2010 | Poot et al. | |
| 2010/0303289 A1 | 12/2010 | Polzin et al. | |
| 2010/0322516 A1 | 12/2010 | Xu et al. | |
| 2010/0322534 A1 * | 12/2010 | Bolme | G06K 9/746 382/278 |
| 2011/0025689 A1 | 2/2011 | Perez et al. | |
| 2011/0052006 A1 | 3/2011 | Gurman et al. | |
| 2011/0164032 A1 | 7/2011 | Shadmi et al. | |
| 2011/0175984 A1 | 7/2011 | Tolstaya et al. | |
| 2011/0182477 A1 | 7/2011 | Tamrakar et al. | |
| 2011/0211754 A1 | 9/2011 | Litvak et al. | |
| 2011/0237324 A1 | 9/2011 | Clavin et al. | |
| 2011/0291926 A1 | 12/2011 | Gokturk et al. | |
| 2011/0292036 A1 | 12/2011 | Sali et al. | |
| 2011/0293137 A1 | 12/2011 | Gurman et al. | |
| 2012/0070070 A1 | 3/2012 | Litvak | |
| 2012/0087572 A1 | 4/2012 | Dedeoglu et al. | |
| 2012/0162065 A1 | 6/2012 | Tossell et al. | |
| 2012/0201431 A1 * | 8/2012 | Komura | G06K 9/00006 382/115 |
| 2012/0269441 A1 * | 10/2012 | Marchesotti | G06N 99/005 382/195 |
| 2015/0227783 A1 | 8/2015 | Gurman et al. | |
| 2015/0363655 A1 * | 12/2015 | Artan | G06K 9/00228 382/103 |
| 2016/0042223 A1 * | 2/2016 | Suh | G06K 9/6296 348/156 |
| 2016/0275337 A1 * | 9/2016 | Shibutani | G06K 9/00288 |
| 2016/0292490 A1 * | 10/2016 | Cheng | G06K 9/00033 |

FOREIGN PATENT DOCUMENTS

| | | |
|---|---|---|
| WO | 199935633 A2 | 7/1999 |
| WO | 2003071410 A2 | 8/2003 |

(56) References Cited

FOREIGN PATENT DOCUMENTS

| | | |
|---|---|---|
| WO | 2004107272 A1 | 12/2004 |
| WO | 2005003948 A1 | 1/2005 |
| WO | 2005094958 A2 | 10/2005 |
| WO | 2007043036 A1 | 4/2007 |
| WO | 2007078639 A2 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2010004542 A1 | 1/2010 |

OTHER PUBLICATIONS

Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.
Gesturetek Inc., Consumer Electronics Solutions, "Gesture Control Solutions for Consumer Devices", www.gesturetek.com, Toronto, Ontario, 1 page, Canada, 2009.
Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.
Avidan et al., "Trajectory triangulation: 3D reconstruction of moving points from amonocular image sequence", PAMI, vol. 22, No. 4, pp. 348-357, Apr. 2000.
Leclerc et al., "The direct computation of height from shading", IEEE Conference on Computer Vision and Pattern Recognition, pp. 552-558, Jun. 3-7, 1991.
Zhang et al., "Shape from intensity gradient", IEEE Transactions on Systems, Man, and Cybernetics—Part A: Systems and Humans, vol. 29, No. 3, pp. 318-325, May 1999.
Zhang et al., "Height recovery from intensity gradients", IEEE Conference on Computer Vision and Pattern Recognition, pp. 508-513, Jun. 20-24, 1994.
Horn, B., "Height and gradient from shading", International Journal of Computer Vision , vol. 5, No. 1, pp. 37-75, Aug. 1990.
Bruckstein, A., "On Shape from Shading", Computer Vision, Graphics, and Image Processing Journal, vol. 44, Issue 2, pp. 139-154, Nov. 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, 13 pages, Jun. 19-21, 2002.
Besl, P., "Active Optical Range Imaging Sensors", Journal Machine Vision and Applications, vol. 1, issue 2, pp. 127-152, Apr. 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence, vol. 10, No. 5, pp. 749-754, Sep. 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Kimmel et al., Analyzing and synthesizing images by evolving curves with the Osher-Sethian method, International Journal of Computer Vision, vol. 24, issue 1, pp. 37-55, Aug. 1997.
Zigelman et al., "Texture mapping using surface flattening via multi-dimensional scaling", IEEE Transactions on Visualization and Computer Graphics, vol. 8, issue 2, pp. 198-207, Apr.-Jun. 2002.
Dainty, J.C., "Introduction", Laser Speckle and Related Phenomena, pp. 1-7, Springer-Verlag, Berlin Heidelberg, 1975.
Mendlovic, et al., "Composite harmonic filters for scale, projection and shift invariant pattern recognition", Applied Optics Journal, vol. 34, No. 2, pp. 310-316, Jan. 10, 1995.
Fua et al., "Human Shape and Motion Recovery Using Animation Models", 19th Congress, International Society for Photogrammetry and Remote Sensing, Amsterdam, The Netherlands, 16 pages, Jul. 2000.
Allard et al., "Marker-less Real Time 3D modeling for Virtual Reality", Immersive Projection Technology, Iowa State University, 8 pages, 2004.
Howe et al., "Bayesian Reconstruction of 3D Human Motion from Single-Camera Video", Advances in Neural Information Processing Systems 12, Denver, USA, 7 pages, 1999.
Ascension Technology Corporation, "Flock of Birds: Real-Time Motion Tracking", 2 pages, 2008.
Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 1-10, 2001.
Niesbat, S., "A System for Fast, Full-Text Entry for Small Electronic Devices", Proceedings of the 5th International Conference on Multimodal Interfaces, ICMI 2003, Vancouver, Canada, 8 pages, Nov. 5-7, 2003.
Softkinetic S.A., "3D Gesture Recognition Platform for Developers of 3D Applications", Product Datasheet, IISU™, www.softkinetic-optrima.com, Belgium, 2 pages, 2007-2010.
Li et al., "Real-Time 3D Motion Tracking with Known Geometric Models", Real-Time Imaging Journal, vol. 5, pp. 167-187, Academic Press 1999.
Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.
Vogler et al., "ASL recognition based on a coupling between HMMs and 3D motion analysis", Proceedings of IEEE International Conference on Computer Vision, pp. 363-369, Mumbai, India, Jan. 4-7, 1998.
Gionis et al., "Similarity Search in High Dimensions via Hashing", Proceedings of the 25th Very Large Database (VLDB) Conference, Edinburgh, UK, 12 pages, Sep. 7-10, 1999.
Bleiweiss et al., "Markerless Motion Capture Using a Single Depth Sensor", SIGGRAPH Asia 2009, Yokohama, Japan, 1 page, Dec. 16-19, 2009.
Comaniciu et al., "Mean Shift: A Robust Approach Toward Feature Space Analysis", IEEE Transactions on Pattern Analysis and Machine Intelligence, vol. 24, No. 4, pp. 603-619, May 2002.
Datar et al., "Locality-Sensitive Hashing Scheme Based on p-Stable Distributions", Proceedings of the Symposium on Computational Geometry, pp. 253-262, Brooklyn, USA, Jun. 9-11, 2004.
Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.
Holte et al., "Gesture Recognition using a Range Camera", Technical Report, Laboratory of Computer Vision and Media Technology, Aalborg University, Denmark, 5 pages, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 11 pages, Jun. 2007.
Nam et al., "Recognition of Hand Gestures with 3D, Nonlinear Arm Movements", Pattern Recognition Letters, vol. 18, No. 1, pp. 105-113, Elsevier Science B.V. 1997.
U.S. Appl. No. 14/697,661 Office Action dated Jun. 9, 2017.
Ren et al., "Faster R-CNN: Towards Real-Time Object Detection with Region Proposal Networks", 14 pages, Jan. 6, 2016.
Eshet et al., U.S. Appl. No. 15/272,455 filed Sep. 22, 2016.
U.S. Appl. No. 15/272,455 office action dated Dec. 27, 2017.

(56) References Cited

OTHER PUBLICATIONS

Ding et al., "Range Image Segmentation Using Principal Curvatures and Principal Directions", 5th International Conference on Information Communications and Signal Processing, pp. 320-323, Dec. 2005.

Deboeverie., "Curvature-based Human Body Parts Segmentation in Physiotherapy", 10th International conference on computer vision theory and applications—VISAPP, pp. 630-637, Mar. 11-14, 2015.

Primesense Inc., "Prime Sensor™ NITE 1.1 Framework Programmer's Guide", Version 1.2, 34 pages, 2009.

Luxand Inc., "Luxand FaceSDK 3.0 Face Detection and Recognition Library Developer's Guide", 45 pages, years 2005-2010.

Intel Corporation, "Open Source Computer Vision Library Reference Manual", 377 pages, years 1999-2001.

Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.

Muja et al., "Fast Approximate Nearest Neighbors with Automatic Algorithm Configuration", International Conference on Computer Vision Theory and Applications, pp. 331-340, Lisboa, Portugal, Feb. 5-8, 2009.

Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.

Agarwal et al., "Monocular Human Motion Capture with a Mixture of Regressors", Proceedings of the 2004 IEEE Conference on Computer Vision and Pattern Recognition, San Diego, USA, 8 pages, Jun. 20-26, 2005.

Lv et al., "Single View Human Action Recognition Using Key Pose Matching and Viterbi Path Searching", Proceedings of IEEE Conference on Computer Vision and Pattern Recognition, Minneapolis, USA, 20 pages, Jun. 17-22, 2007.

Munoz-Salinas et al., "People Detection and Tracking Using Stereo Vision and Color", Image and Vision Computing, vol. 25, No. 6, pp. 995-1007, Jun. 1, 2007.

Bradski, G., "Computer Vision Face Tracking for Use in a Perceptual User Interface", Intel Technology Journal, 15 pages, vol. 2, issue 2 (2nd Quarter 2008).

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, 5 pages, Sep. 2001.

Kolsch et al., "Fast 2D Hand Tracking with Flocks of Features and Multi-Cue Integration", IEEE Workshop on Real-Time Vision for Human Computer Interaction (at CVPR'04), Washington, USA, 8 pages, Jun. 27-Jul. 2, 2004.

Shi et al., "Good Features to Track", IEEE Conference on Computer Vision and Pattern Recognition, pp. 593-600, Seattle, USA, Jun. 21-23, 1994.

Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.

Submuth et al., "Ridge Based Curve and Surface Reconstruction", Eurographics Symposium on Geometry Processing, Barcelona, Spain, 9 pages, Jul. 4-6, 2007.

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

Cohen et al., "Interference of Human Postures by Classification of 3D Human Body Shape", IEEE International Workshop on Analysis and Modeling of Faces and Gestures, ICCV 2003, Nice, France, 8 pages, Oct. 14-17, 2002.

Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.

Borenstein et al., "Combining Top-down and Bottom-up Segmentation", Proceedings of the IEEE Conference on Computer Vision and Pattern Recognition, 8 pages, Jun. 27-Jul. 2, 2004.

Karlinsky et al., "Combined Model for Detecting, Localizing, Interpreting and Recognizing Faces", Faces in Real-Life Images workshop, European Conference on Computer Vision, France, 14 pages, Oct. 12-18, 2008.

Ullman, S., "Object Recognition and Segmentation by a Fragment-Based Hierarchy", Trends in Cognitive Sciences, vol. 11, No. 2, pp. 58-64, Feb. 2007.

Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.

Ramanan et al., "Training Deformable Models for Localization", Proceedings of the 2006 IEEE Conference on Computer Vision and Pattern Recognition, pp. 206-213, New York, USA, Jun. 17-22, 2006.

Ramanan, D., "Learning to Parse Images of Articulated Bodies", Neural Information Processing Systems Foundation 8 pages, year 2006.

Jiang, H., "Human Pose Estimation Using Consistent Max-Covering", 12th IEEE International Conference on Computer Vision, Kyoto, Japan, 8 pages, Sep. 27-Oct. 4, 2009.

Shotton et al., "Real-Time Human Pose Recognition in Parts from Single Depth Images", 24th IEEE Conference on Computer Vision and Pattern Recognition, Colorado Springs, USA, 8 pages, Jun. 20-25, 2011.

Rodgers et al., "Object Pose Detection in Range Scan Data", IEEE Conference on Computer Vision and Pattern Recognition, pp. 2445-2452, New York, USA, Jun. 17-22, 2006.

Gordon et al., "Face recognition based on depth maps and surface curvature", Proceedings of SPIE Geometric methods in Computer Vision, vol. 1570, pp. 234-247, Sep. 1, 1991.

Kim et al., "Real-time normalization and feature extraction of 3D face data using curvature characteristics", Proceedings 10th IEEE International Workshop on Robot and Human Interactive Communication, pp. 74-79, Sep. 18-21, 2001.

Colombo et al., "3D face detection using curvature analysis", Pattern Recognition, vol. 39, No. 3, pp. 444-455, Mar. 1, 2006.

Alyuz et al., "Regional Registration for Expression Resistant 3-D Face Recognition", IEEE Transactions on Information Forensics and Security, vol. 5, No. 3, pp. 425-440, Sep. 1, 2010.

Lee et al., "Matching range images of human faces", Proceedings of 3rd International Conference on Computer Vision, vol. 3, pp. 722-726, Dec. 4-7, 1990.

Alyuz et al., "Robust 3D face recognition in the presence of realistic occlusions", 5th IAPR International Conference on Biometrics (ICB), pp. 111-118, Mar. 29-Apr. 1, 2012.

International Application # PCT/US2017/039172 search report dated Sep. 15, 2017.

Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.

Li et al., "Statistical modeling of complex backgrounds for foreground object detection", IEEE Transactions on Image Processing, vol. 13, No. 11,pp. 1459-1472, Nov. 2004.

Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.

Ess et al., "Improved multi-person tracking with active occlusion handling", ICRA workshop of people Detection and tracking, pp. 1-6, 2009.

Cucchiara et al., "Track-based and object-based occlusion for people tracking refinement indoor surveillance", VSSN, pp. 1-7, 2004.

(56) References Cited

OTHER PUBLICATIONS

Krumm et al., "Multi-camera multi person tracking for EasyLiving"., Visual surveillance, 2000, Proceedings, Third International workshop pp. 1-8, 2000.

Yous et al., "People detection and tracking with World-Z map from single stereo camera".,Visual surveillance, 2008, Eighth International workshop , pp. 1-8, 2008.

Damen et al., "Detecting carried objects in short video sequences", ECCV , School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance-based approach for consistent labeling of humans and objects in video", Pattern Analysis and Application, pp. 373-385, 2004.

\* cited by examiner

CURVATURE-BASED FACE DETECTOR

CROSS-REFERENCE TO RELATED APPLICATION

This application claims the benefit of U.S. Provisional Patent Application 62/396,839, filed Sep. 20, 2016, which is incorporated herein by reference.

FIELD OF THE INVENTION

The present invention relates generally to methods and systems for three-dimensional (3D) mapping, and specifically to processing of 3D map data.

BACKGROUND

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel depth value, indicative of the distance from a certain reference location to the respective scene location. In other words, the depth map has the form of an image in which the pixel values indicate topographical information, rather than brightness and/or color of the objects in the scene. Depth maps may be created, for example, by detection and processing of an image of an object onto which a pattern is projected, as described in U.S. Pat. No. 8,456,517, whose disclosure is incorporated herein by reference. The terms "depth map" and "3D map" are used herein interchangeably and have the same meaning.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, U.S. Pat. No. 8,249,334, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

As another example, U.S. Pat. No. 8,565,479, whose disclosure is incorporated herein by reference, describes a method for processing a temporal sequence of depth maps of a scene containing a humanoid form. A digital processor processes at least one of the depth maps so as to find a location of the head of the humanoid form, and estimates dimensions of the humanoid form based on this location. The processor tracks movements of the humanoid form over the sequence using the estimated dimensions.

U.S. Pat. No. 9,047,507, whose disclosure is incorporated herein by reference, describes a method that includes receiving a depth map of a scene containing at least an upper body of a humanoid form. The depth map is processed so as to identify a head and at least one arm of the humanoid form in the depth map. Based on the identified head and at least one arm, and without reference to a lower body of the humanoid form, an upper-body pose, including at least three-dimensional (3D) coordinates of shoulder joints of the humanoid form, is extracted from the depth map.

SUMMARY

Embodiments of the present invention provide methods, devices and software for extracting information from depth maps.

There is therefore provided, in accordance with an embodiment of the invention, a method for processing data, which includes receiving a depth map of a scene containing at least a humanoid head, the depth map comprising a matrix of pixels having respective pixel depth values. Using a digital processor, a curvature map of the scene is extracted from the depth map. The curvature map includes respective curvature values of at least some of the pixels in the matrix. The curvature values are processed in order to identify a face in the scene.

In some embodiments, processing the curvature values includes detecting one or more blobs in the curvature map over which the pixels have respective curvature values that are indicative of a convex surface, and identifying one of the blobs as the face. Typically, the curvature map includes respective curvature orientations of the at least some of the pixels, and identifying the one of the blobs includes calculating a roll angle of the face responsively to the curvature orientations of the pixels in the one of the blobs. In a disclosed embodiment, processing the curvature values includes applying a curvature filter to the curvature map in order to ascertain whether the one of the blobs is the face while correcting for the calculated roll angle.

Additionally or alternatively, processing the curvature values includes calculating a scale of the face responsively to a size of the one of the blobs, and applying a curvature filter to the curvature map in order to ascertain whether the one of the blobs is the face while correcting for the calculated scale.

Further additionally or alternatively, extracting the curvature map includes deriving a first curvature map from the depth map at a first resolution, and detecting the one or more blobs includes finding the one or more blobs in the first curvature map, and processing the curvature values includes deriving a second curvature map containing the one of the blobs at a second resolution, finer than the first resolution, and identifying the face using the second curvature map.

In some embodiments, processing the curvature values includes convolving the curvature map with a curvature filter kernel in order to find a location of the face in the scene. In a disclosed embodiment, convolving the curvature map includes separately applying a face filter kernel and a nose filter kernel in order to compute respective candidate locations of the face, and finding the location based on the candidate locations. Additionally or alternatively, convolving the curvature map includes computing a log likelihood value for each of a plurality of points in the scene, and choosing the location responsively to the log likelihood value.

There is also provided, in accordance with an embodiment of the invention, apparatus for processing data, including an imaging assembly, which is configured to capture a depth map of a scene containing at least a humanoid head, the depth map including a matrix of pixels having respective pixel depth values. A processor is configured to extract from the depth map a curvature map of the scene, the curvature map including respective curvature values of at least some of the pixels in the matrix, and to process the curvature values in order to identify a face in the scene.

There is additionally provided, in accordance with an embodiment of the invention, a computer software product, including a non-transitory computer-readable medium in which program instructions are stored, which instructions, when read by a computer, cause the computer to receive a depth map of a scene containing at least a humanoid head, the depth map including a matrix of pixels having respective pixel depth values, to extract from the depth map a curvature map of the scene, the curvature map including respective curvature values of at least some of the pixels in the matrix, and to process the curvature values in order to identify a face in the scene.

The present invention will be more fully understood from the following detailed description of the embodiments thereof, taken together with the drawings in which:

DETAILED DESCRIPTION OF EMBODIMENTS

U.S. patent application Ser. No. 15/272,455, filed Sep. 22, 2016, whose disclosure is incorporated herein by reference, describes methods, systems and software for extracting humanoid forms from depth maps. In the disclosed methods, a digital processor extracts a curvature map from the depth map of a scene containing a humanoid form. The curvature map comprises respective oriented curvatures of at least some of the pixels in the depth map. In other words, at each of these pixels, the curvature map holds a scalar signed value indicating the dominant curvature value and the corresponding curvature orientation, i.e., the direction of the dominant curvature, expressed as a two-dimensional (2D) vector. The processor segments the depth map using both curvature values and orientations in the curvature map, and thus extracts 3D location and orientation coordinates of one or more limbs of the humanoid form.

The processor segments the depth map by identifying blobs in the curvature map over which the pixels have a positive curvature, meaning that the surfaces of these blobs are convex (although this definition of "positive" curvature is arbitrary, and curvature could alternatively be defined so that convex surfaces have negative curvature). The edges of the blobs are identified in the depth map at locations of sign changes in the curvature map. This use of curvature enhances the reliability and robustness of segmentation, since it enables the processor to distinguish between different blobs and between blobs and the background even when there is no marked change in depth at this edges of a given blob, as may occur when one body part occludes another, or when a body part is resting against a background surface or other object.

Embodiments of the present invention that are described herein process curvature maps specifically in order to identify one or more faces in the scene. Typically, in the disclosed methods, one or more blobs are detected in a curvature map as described above. The curvature orientations of the pixels in a blob that is a candidate to correspond to a face are processed in order to estimate the roll angle of the face. A curvature filter can then be applied to the curvature map while correcting for the calculated roll angle, in order to ascertain the likelihood that this blob is indeed a face. Additionally or alternatively, the size of the blob can be used to estimate and correct for the scale of the face.

Various sorts of classifiers can be used to extract faces from the curvature map. In some embodiments, which are described in greater detail hereinbelow, the curvature map is convolved with one or more curvature filter kernels in order to find the location of a face in the scene. In one embodiment, a face filter kernel and a nose filter kernel are applied separately in order to compute respective candidate locations, which are used in finding the actual face location. These filters are matched to the curvature features of a typical face (including the relatively high convex curvature of the nose), and are relatively insensitive to pitch and yaw of the face. The roll angle and scale can be normalized separately, as explained above. The filter can be configured to return a log likelihood value for each candidate point in the scene, whereby points having the highest log likelihood value can be identified as face locations.

Figure 1:
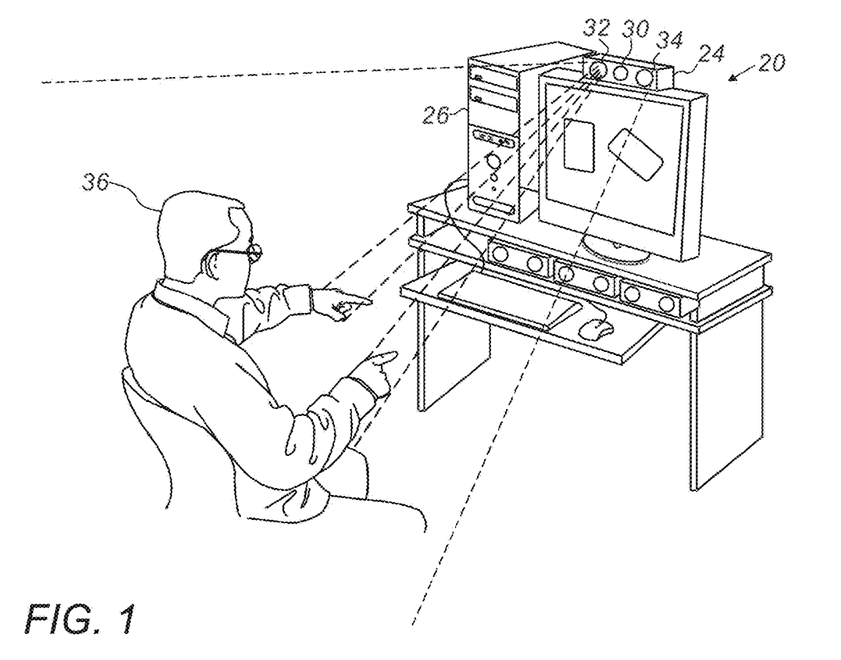
FIG. 1 is a schematic, pictorial illustration of a system for 3D mapping of humanoid forms, in accordance with an embodiment of the present invention.

FIG. 1 is a schematic, pictorial illustration of a system 20 for depth mapping and imaging, in accordance with an embodiment of the present invention. In this example, an imaging assembly 24 is configured to capture and process depth maps and images of a scene, which in this case contains a humanoid subject 36. An imaging assembly of this sort is described, for example, in the above-mentioned U.S. Pat. No. 8,456,517. The principles of the present invention are by no means limited to the sort of pattern-based mapping that is described in this patent, however, and may be applied in processing depth maps generated by substantially any suitable technique that is known in the art, such as depth mapping based on stereoscopic imaging or time-of-flight measurements.

In the example shown in FIG. 1, a projector 30 in imaging assembly 24 projects a pattern of optical radiation onto the scene, and a depth camera 32 captures an image of the pattern that appears on the scene (including at least the head of subject 36). A processing device in assembly 24 processes the image of the pattern in order to generate a depth map of at least a part of the body of subject 36, i.e., an array of 3D coordinates, comprising a depth (Z) coordinate value of the objects in the scene at each point (X,Y) within a predefined area. (In the context of an array of image-related data, these (X,Y) points are also referred to as pixels.) Optionally, a color camera 34 in imaging assembly 24 also captures color (2D) images of the scene, but such 2D images are not required by the methods of face detection that are described hereinbelow. Rather, the disclosed methods rely exclusively on depth information in classifying an object in the scene as a face and identifying its location.

Imaging assembly 24 generates a data stream that includes depth maps for output to an image processor, such as a computer 26. Although computer 26 is shown in FIG. 1 as a separate unit from imaging assembly 24, the functions of these two components may alternatively be combined in a single physical unit, and the depth mapping and image processing functions of system 20 may even be carried out by a single processor. Computer 26 processes the data generated by assembly 24 in order to detect the face of subject 36 and/or other subjects who may appear in the depth map. Typically, computer 26 comprises a general-purpose computer processor, which is programmed in software to carry out the above functions. The software may be downloaded to the processor in electronic form, over a network, for example, or it may alternatively be provided on tangible, non-transitory media, such as optical, magnetic, or electronic memory media. Further alternatively or additionally, at least some of the functions of computer 26 may be carried out by hard-wired or programmable logic components.

Figure 2:
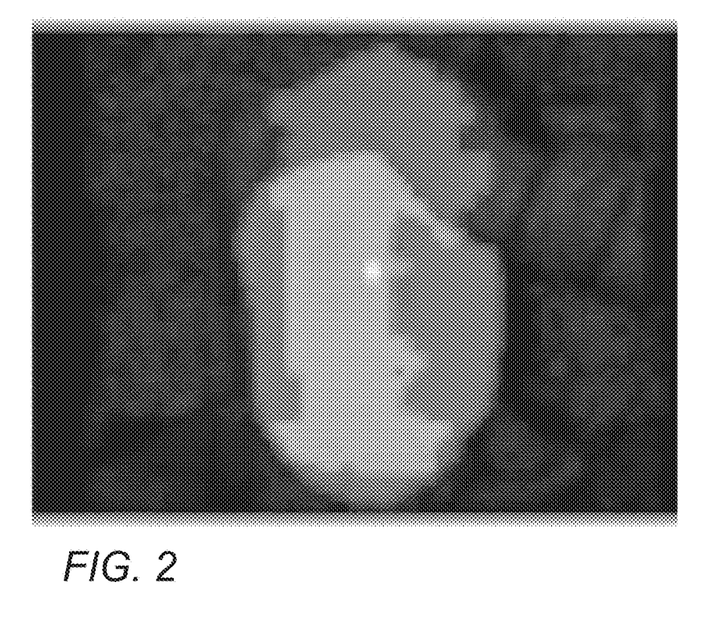
FIG. 2 is a schematic representation of a depth map, layered with a predicted face blob, in accordance with an embodiment of the present invention.

FIG. 2 is a schematic representation of a depth map captured by assembly 24, in accordance with an embodiment of the present invention. The depth map, as explained above, comprises a matrix of pixels having respective depth values. The depth values are represented in FIG. 2 as gray-scale values, with darker shades of gray corresponding to larger depth values, i.e., locations farther from assembly 24. (Black areas correspond to pixels for which no depth values could be determined.) In this particular scene, the subject has placed his hand on his head, thus obscuring some of the contours of the head.

Figure 3:
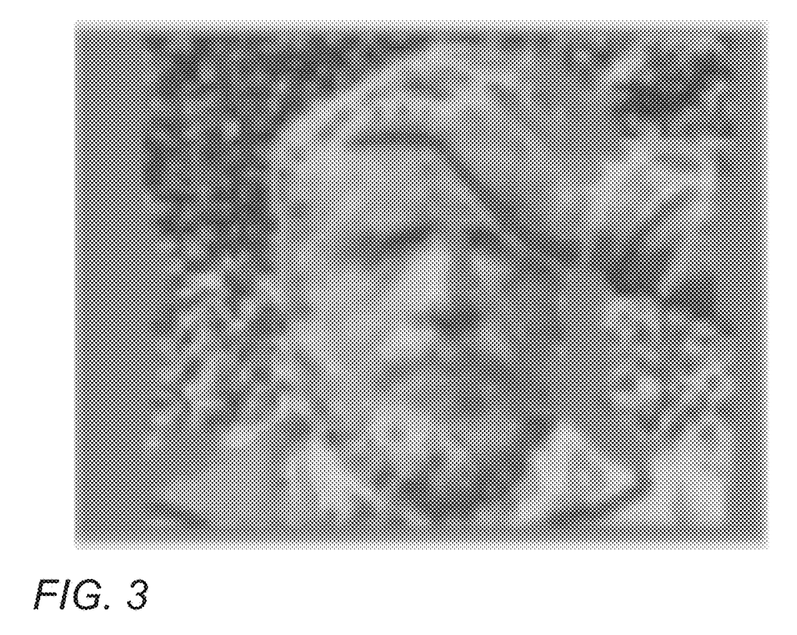
FIG. 3 is a schematic representation of a normal map extracted from the depth map of FIG. 2 at low resolution, in accordance with an embodiment of the present invention.

FIG. 3 is a schematic representation of a normal map extracted from the depth map of FIG. 2 at low resolution, in accordance with an embodiment of the present invention. This normal map is computed at a low resolution level, for example 40×30 pixels, which in this case is 1/16 the size of the depth map acquired by assembly 24. Although this and the ensuing steps of the present method can also be performed at a finer resolution, it is advantageous in terms of computing speed that the initial steps (up to finding blobs in the depth map, as explained below) be performed at a coarse level of resolution.

The normal map is computed as follows: Taking u-v to be the surface parameterization grid of the depth map, p =p(u,v) represents the surface points of the depth map of FIG. 2 in 3D. Based on the depth values in this map, computer 26 calculates the cross-product of the depth gradients at each point. The result of this computation is the normal map shown in FIG. 3, in which N=N(u,v) is the surface normal at point p, so that each pixel holds a vector value corresponding to the direction of the normal to the surface defined by the depth map at the corresponding point is space. The normal vectors are difficult to show in gray-scale representation, and the normal map in FIG. 3 is therefore presented only for the sake of general illustration. Pixels whose normals are close to the Z-direction (pointing out of the page) have lighter shades of gray in FIG. 3, while those angled toward the X-Y plane are darker. In this respect, the high curvature of the head and hand can be observed in terms of the marked gray-scale gradation in FIG. 3, and this feature will be used in the subsequent steps of the analysis.

Computer 26 next computes a (low-resolution) curvature map, based on this normal map. The curvature computed for each pixel at this step can be represented in a 2×2 matrix form known in 3D geometry as the shape operator, S, which is defined as follows:

$$x1 = \frac{\partial p}{\partial u}$$

$$x2 = \frac{\partial p}{\partial v}$$

$$G = \begin{pmatrix} x1 \cdot x1 & x1 \cdot x2 \\ x1 \cdot x2 & x2 \cdot x2 \end{pmatrix}$$

$$B = \begin{pmatrix} \frac{\partial N}{\partial u} \cdot x1 & \frac{\partial N}{\partial u} \cdot x2 \\ \frac{\partial N}{\partial v} \cdot x1 & \frac{\partial N}{\partial v} \cdot x2 \end{pmatrix}$$

$$S = B \cdot G^{-1}$$

Computer 26 extracts the shape operator eigenvectors, corresponding to the two main curvature orientations, and the shape operator eigenvalues, corresponding to the curvature values along these orientations. The curvature map comprises the dominant curvature per pixel, i.e., the eigenvalue with the larger absolute value and the corresponding curvature orientation. The raw curvature value can be either positive or negative, with positive curvature corresponding to convex surface patches, and negative curvature corresponding to concave surface patches.

Figure 4:
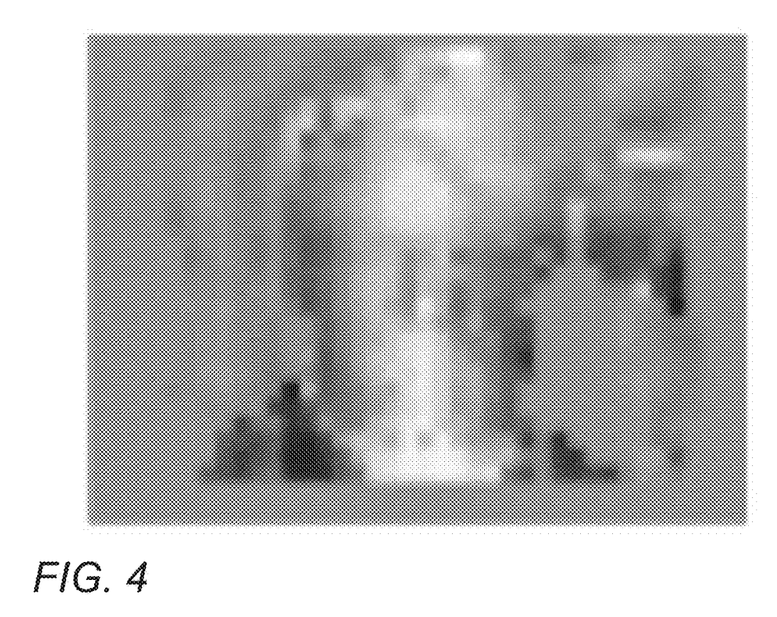
FIG. 4 is a schematic representation of a coarse-level curvature map extracted from the normal map of FIG. 3, in accordance with an embodiment of the present invention.
Figure 6:
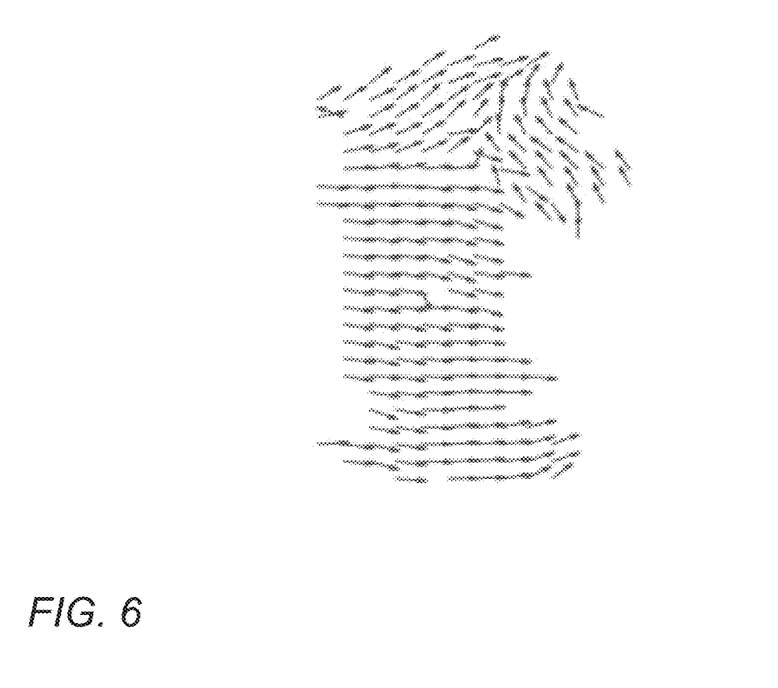
FIG. 6 is a schematic representation of a map of curvature direction within the blobs found in FIG. 5, in accordance with an embodiment of the invention.

FIG. 4 is a schematic representation of a curvature map extracted from the normal map of FIG. 3 (and hence from depth map of FIG. 2), in accordance with an embodiment of the present invention. Due to the limitations of gray-scale graphics, this curvature map shows only the magnitude of the curvature (i.e., the dominant eigenvalue of the curvature matrix, as explained above), whereas curvature directions are shown in FIG. 6, as described below. Pixels with strongly positive curvature values have light shades of gray in the curvature map, while pixels with negative curvature values are dark gray.

Computer 26 uses the curvature map in extracting blobs having positive curvature from the original depth map. Since body parts, such as the head and hand, are inherently convex, positive curvature within a blob of pixels is a necessary condition for the blob to correspond to such a body part. Furthermore, transitions from positive to negative curvature are good indicators of the edges of a body part, even when the body part is in contact with another object without a sharp depth gradation between the body part and the object.

Figure 5:
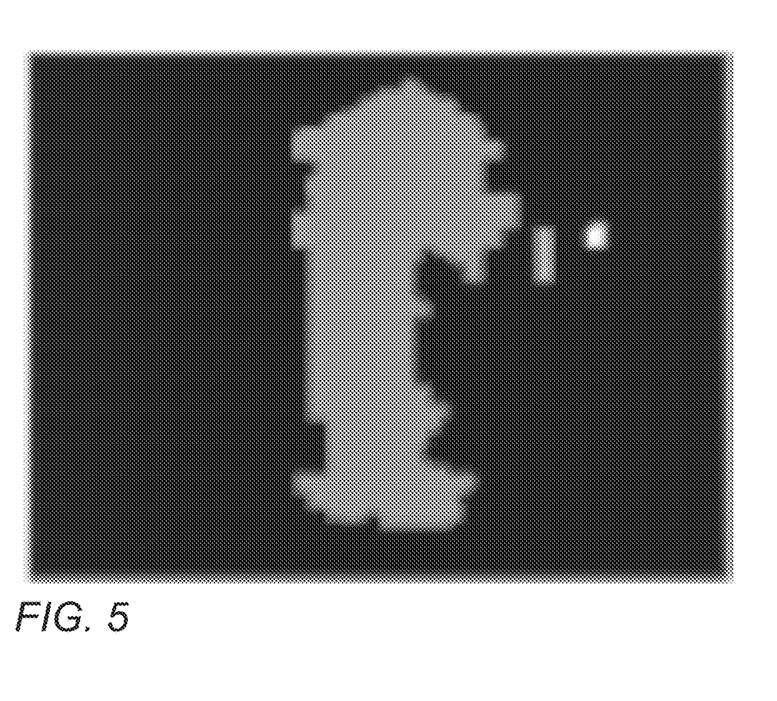
FIG. 5 is a schematic representation of a map of blobs extracted from the curvature map of FIG. 4, in accordance with an embodiment of the invention.

FIG. 5 is a schematic representation of a map of blobs extracted from the curvature map of FIG. 4, in accordance with an embodiment of the invention. The blobs due to the head and hand (which run together in FIG. 5) have strongly-positive curvature and thus can be clearly segmented from other objects based on the changes in sign of the curvature at their edges.

FIG. 6 is a schematic representation of a map of curvature direction within the blobs found in FIG. 5, in accordance with an embodiment of the invention. Computer uses the pixel-wise curvature orientations in the curvature map to find the axes of curvature of the blobs in the curvature map. The curvature vector direction, as explained above, is the direction of the major (dominant) eigenvector of the curvature matrix found in the curvature computation process. The axis of each blob is a line in the depth map (or curvature map) that runs through the center of mass of the blob in a direction perpendicular to the dominant curvature direction over the blob. This axis will be used subsequently in normalizing the classifier that is applied for face identification so as to compensate for the effect of roll, i.e., tilting the head from side to side.

Typically, computer 26 identifies the dominant curvature direction of a given blob as the statistical mode of the curvature directions of all the pixels. In other words, for each blob, the computer constructs a histogram of the curvature directions of the pixels in the blob, and identifies the dominant curvature direction as the mode of the histogram. If the histogram contains multi-modal behavior, each mode is analyzed independently, dividing the blob into multiple sub-blobs. On this basis, in the example shown in FIG. 6, the head blob, with a vertical curvature axis, is segmented from the smaller hand blob, with a diagonal curvature axis. Alternatively, other statistical averages, such as the mean or median, may be identified as the dominant curvature direction.

Figure 7:
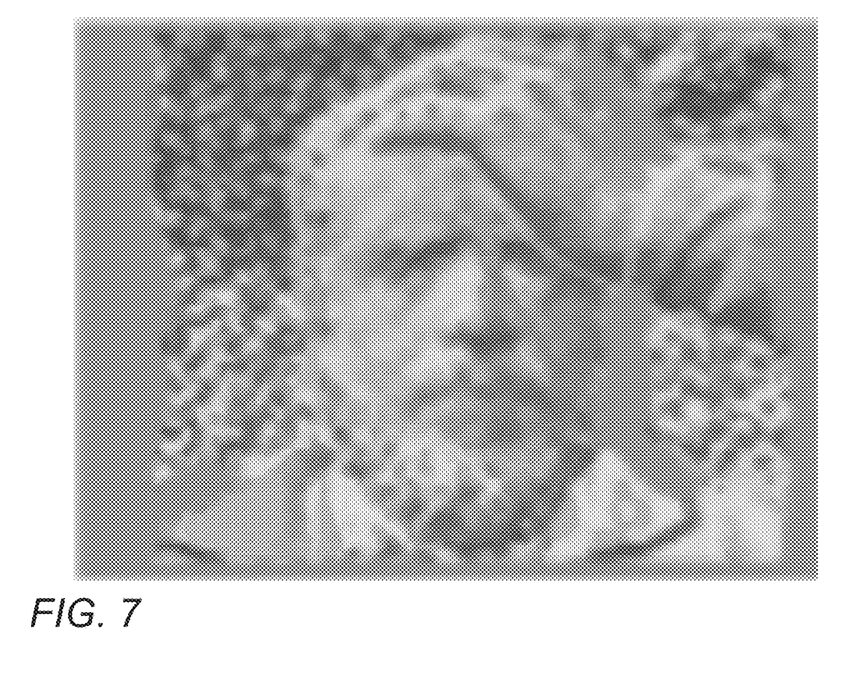
FIG. 7 is a schematic representation of a normal map extracted from the depth map of FIG. 2 at high resolution, in accordance with an embodiment of the present invention.
Figure 8:
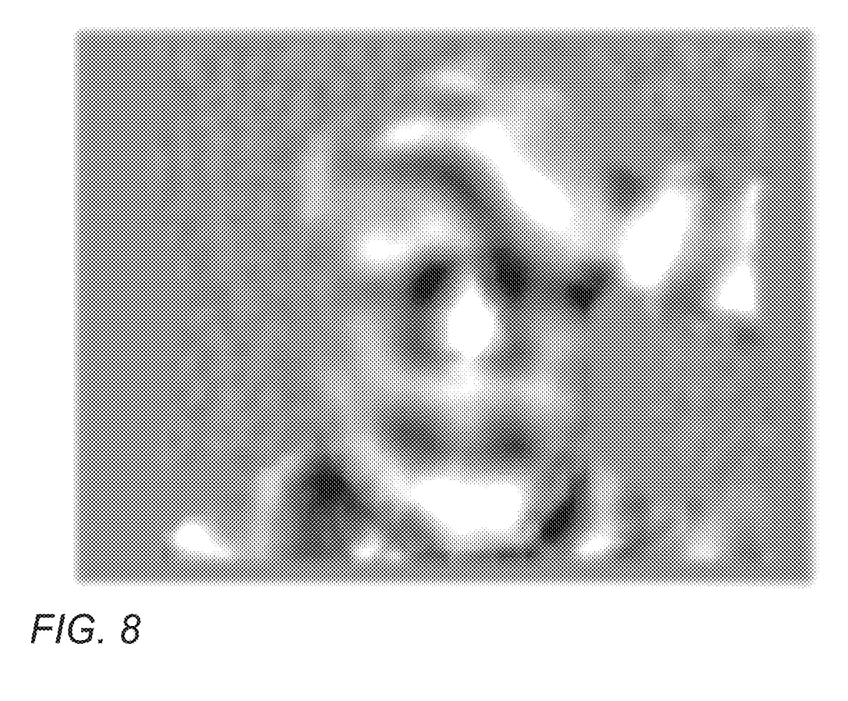
FIG. 8 is a schematic representation of a fine-grained curvature map extracted from the normal map of FIG. 7, in accordance with an embodiment of the present invention.

Having identified the blob or blobs in the depth map that are candidates to be faces, computer 26 now proceeds to process the data from these blobs in the depth map in order to decide which, if any, can be confidently classified as faces. Assuming the first phase of depth map analysis, up to identification of the candidate blobs and their axes, was performed at low resolution, as explained above, computer 26 typically processes the data in the blobs during the second, classification phase at a finer resolution. Thus, for example, FIG. 7 is a schematic representation of a normal map extracted from the depth map of FIG. 2 at a resolution of 160×120, while FIG. 8 is a schematic representation of a curvature map extracted from the normal map of FIG. 7, in accordance with an embodiment of the present invention.

Computer 26 next applies a face classifier to this curvature map. In the present embodiment, computer 26 convolves the curvature values of each blob that is to be classified with one or more filter kernels, which return a score for each pixel indicating the likelihood that it is the center point of a face. As part of this classification step, the roll angle of the face is normalized (to the vertical direction, for example) by rotating the axis derived from the curvature orientations of the pixels in the blob being classified. Additionally or alternatively, computer 26 normalizes the scale of the face based on the size of the blob. Equivalently, the filter kernel or kernels that are used in the classification may be rotated and/or scaled.

Figure 9A:
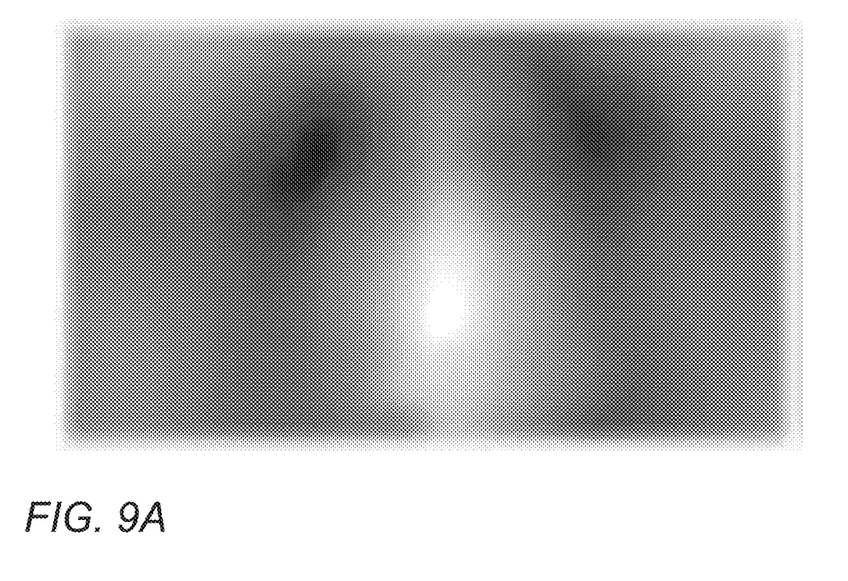
FIGS. 9A and 9B are schematic graphical representations of filter kernels used in face detection, in accordance with an embodiment of the invention.
Figure 9B:
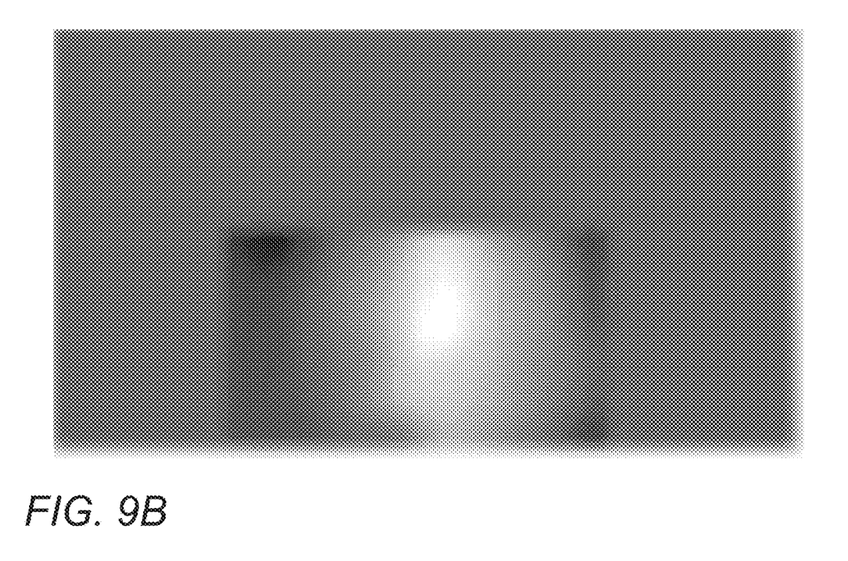

FIGS. 9A and 9B are schematic graphical representations of filter kernels used in face detection, in accordance with an embodiment of the invention. FIG. 9A represents the kernel of a face filter, which matches typical curvature features of a typical face, while FIG. 9B represents the kernel of a nose filter, which matches the high curvature values expected along the ridge of the nose. When convolved with the curvature map, these filter kernels yield a score for each pixel within the blob, indicating the log likelihood that this pixel is the center point of a face.

In addition to the nose region, additional face regions can be taken to generate a set of parts filters. This approach can be used in conjunction with a Deformable Parts Model (DPM), which performs object detection by combining match scores at both whole-object scale and object parts scale. The parts filters compensate for the deformation in the object part arrangement due to perspective changes.

Alternatively or additionally, other kernels may be used. For example, the kernels shown in FIGS. 9A and 9B are optimized for faces whose frontal plane is normal to the axis of depth camera 32, with both yaw (rotation of the head around the vertical axis) and pitch (nodding the head up and down) angles at zero. These curvature-based kernels actually have the advantage of being relatively insensitive to yaw and pitch, due to the geometrical characteristics of the face itself. In order to increase the detection range, however, additional kernels may be defined and convolved with the curvature map, corresponding to different ranges of yaw and/or pitch. For example, computer 26 may apply nine different kernels (or possibly nine pairs of face and nose kernels) corresponding to combinations of yaw=0, ±30° and pitch=0, ±30°.

Figure 10A:
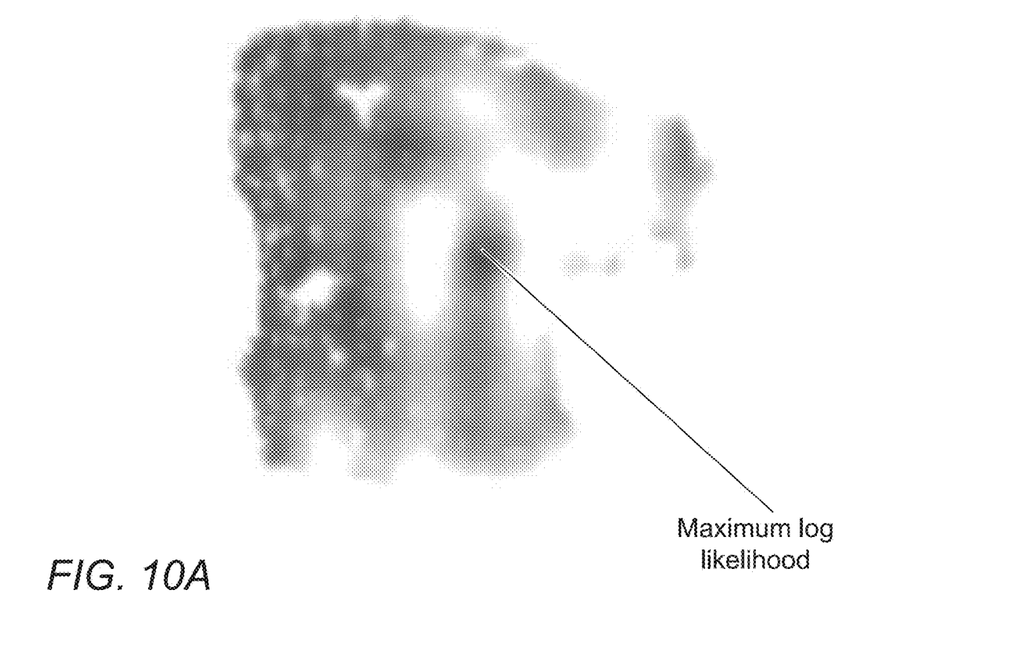
FIGS. 10A and 10B are schematic graphical representations of log likelihood maps obtained by convolving the curvature map of FIG. 8 with the filter kernels of FIGS. 9A and 9B, respectively, in accordance with an embodiment of the invention.
Figure 10B:
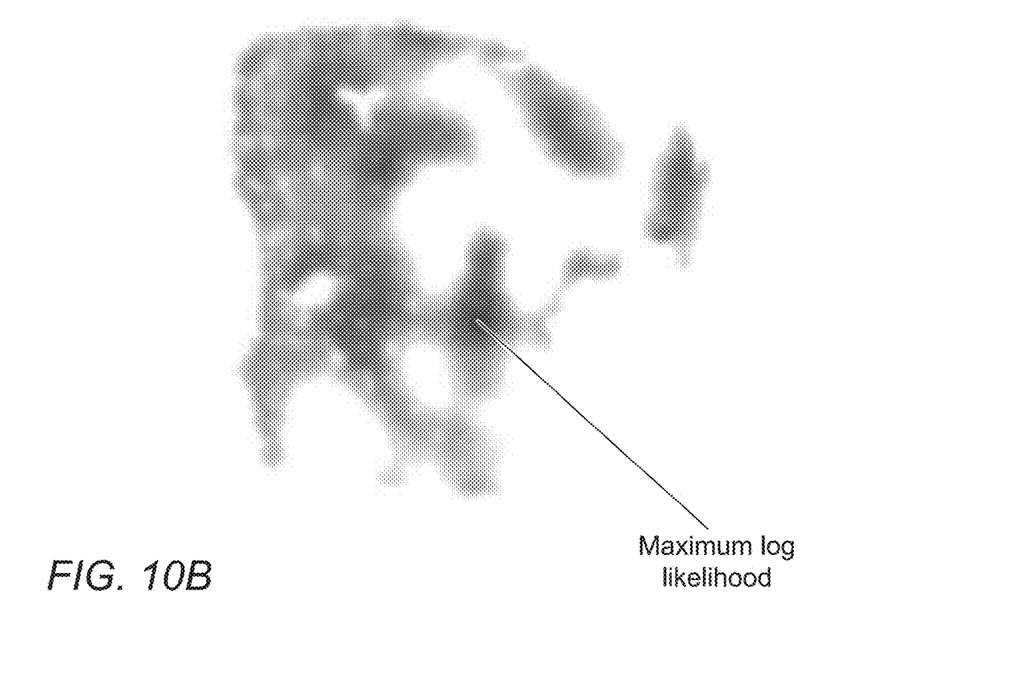

FIGS. 10A and 10B are schematic graphical representations of log likelihood maps obtained by convolving the curvature map of FIG. 8 with the filter kernels of FIGS. 9A and 9B, respectively, in accordance with an embodiment of the invention. The gray scale values in these figures are proportional to the inverse of the log likelihood at each point, meaning that the darkest points in the figures corresponding to the highest log likelihood values. Computer 26 processes these maps in order to identify the blob or blobs that actually correspond to faces in the depth map. In choosing the best candidate face center points the computer considers a number of factors, for example:

Low root mean square error (RMSE) in the face kernel response at the candidate point.

Highly localized face kernel response at the candidate point.

High curvature value at the nose location within the face (as indicated by the nose kernel response).

In the example shown in FIGS. 10A and 10B, the filter kernels both return the same sharp peak in log likelihood at the center of the face in the depth map.

In an alternative embodiment, the principles outlined above are implemented in a deep convolutional neural network (DCNN), rather than or in addition to using explicit filter kernels as in FIGS. 9A and 9B. In this case, the input stream to the DCNN comprises the normal map and the coarse and fine level curvature maps, as described above. The roll and scale can be pre-calculated as described above and used to normalize the input streams to the DCNN. Alternatively, the input can be fed as is, letting the DCNN learn these transformations on its own. As part of the training process, the network learns the filter kernels as opposed to using fixed, "hand-crafted" kernels.

Optionally, the blobs found on the basis of curvature (as in FIG. 6) can be used as region proposals to a region-based neural network. Alternatively, the computer may further filter the depth map with the sorts of predefined filters that are described above, and then pass an even smaller set of final candidate locations to the neural network for evaluation.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
receiving a depth map of a scene containing at least a humanoid head, the depth map comprising a matrix of pixels having respective pixel depth values;

using a digital processor, extracting from the depth map a curvature map of the scene, the curvature map comprising respective curvature values of at least some of the pixels in the matrix; and processing the curvature values in order to detect and segment one or more blobs in the curvature map over which the pixels have respective curvature values that are indicative of a convex surface, to calculate a roll angle of each of the one or more blobs corresponding to an axis perpendicular to a dominant direction of a curvature orientation of the pixels in each of the one or more blobs, and to identify one of the blobs as a face in the scene by applying a face classifier filter to the one or more blobs to calculate a score for each pixel indicating a likelihood that it is a center point of the face while normalizing a rotation between the one or more blobs and the filter using the calculated roll angle.

2. The method according to claim 1, wherein processing the curvature values comprises applying a curvature filter to the curvature map in order to ascertain whether the one of the blobs is the face while correcting for the calculated roll angle.

3. The method according to claim 1, wherein processing the curvature values comprises calculating a scale of the face responsively to a size of the one of the blobs, and applying a curvature filter to the curvature map in order to ascertain whether the one of the blobs is the face while correcting for the calculated scale.

4. The method according to claim 1, wherein extracting the curvature map comprises deriving a first curvature map from the depth map at a first resolution, and wherein detecting the one or more blobs comprises finding the one or more blobs in the first curvature map, and wherein processing the curvature values comprises deriving a second curvature map containing the one of the blobs at a second resolution, finer than the first resolution, and identifying the face using the second curvature map.

5. The method according to claim 1, wherein applying the face classifier filter comprises convolving the curvature map with a curvature filter kernel in order to find a location of the face in the scene.

6. The method according to claim 5, wherein convolving the curvature map comprises separately applying a face filter kernel and a nose filter kernel in order to compute respective candidate locations of the face, and finding the location based on the candidate locations.

7. The method according to claim 5, wherein convolving the curvature map comprises computing a log likelihood value for each of a plurality of points in the scene, and choosing the location responsively to the log likelihood value.

8. The method according to claim 1, wherein extracting the curvature map comprises applying a shape operator to the pixel depth values and finding eigenvectors and eigenvalues of the shape operator corresponding to respective curvature orientations and curvature values of the pixels in the matrix.

9. Apparatus for processing data, comprising:

an imaging assembly, which is configured to capture a depth map of a scene containing at least a humanoid head, the depth map comprising a matrix of pixels having respective pixel depth values; and a processor, which is configured to extract from the depth map a curvature map of the scene, the curvature map comprising respective curvature values of at least some of the pixels in the matrix, and to process the curvature values in order to detect and segment one or more blobs in the curvature map over which the pixels have respective curvature values that are indicative of a convex surface, to calculate a roll angle of each of the one or more blobs corresponding to an axis perpendicular to a dominant direction of a curvature orientation of the pixels in each of the one or more blobs, and to identify one of the blobs as a face in the scene by applying a face classifier filter to the one or more blobs to calculate a score for each pixel indicating a likelihood that it is a center point of the face while normalizing a rotation between the one or more blobs and the filter using the calculated roll angle.

10. The apparatus according to claim 9, wherein processing the curvature values comprises applying a curvature filter to the curvature map in order to ascertain whether the one of the blobs is the face while correcting for the calculated roll angle.

11. The apparatus according to claim 9, wherein processing the curvature values comprises calculating a scale of the face responsively to a size of the one of the blobs, and applying a curvature filter to the curvature map in order to ascertain whether the one of the blobs is the face while correcting for the calculated scale.

12. The apparatus according to claim 9, wherein extracting the curvature map comprises deriving a first curvature map from the depth map at a first resolution, and wherein detecting the one or more blobs comprises finding the one or more blobs in the first curvature map, and wherein processing the curvature values comprises deriving a second curvature map containing the one of the blobs at a second resolution, finer than the first resolution, and identifying the face using the second curvature map.

13. The apparatus according to claim 9, wherein applying the face classifier filter comprises convolving the curvature map with a curvature filter kernel in order to find a location of the face in the scene.

14. The apparatus according to claim 13, wherein convolving the curvature map comprises separately applying a face filter kernel and a nose filter kernel in order to compute respective candidate locations of the face, and finding the location based on the candidate locations.

15. A computer software product, comprising a non-transitory computer-readable medium in which program instructions are stored, which instructions, when read by a computer, cause the computer to receive a depth map of a scene containing at least a humanoid head, the depth map comprising a matrix of pixels having respective pixel depth values, to extract from the depth map a curvature map of the scene, the curvature map comprising respective curvature values of at least some of the pixels in the matrix, and to process the curvature values in order to detect and segment one or more blobs in the curvature map over which the pixels have respective curvature values that are indicative of a convex surface, to calculate a roll angle of each of the one or more blobs corresponding to an axis perpendicular to a dominant direction of a curvature orientation of the pixels in each of the one or more blobs, and to identify one of the blobs as a face in the scene by applying a face classifier filter to the one or more blobs to calculate a score for each pixel indicating a likelihood that it is a center point of the face while normalizing a rotation between the one or more blobs and the filter using the calculated roll angle.

16. The product according to claim 15, wherein applying the face classifier filter comprises convolving the curvature map with a curvature filter kernel in order to find a location of the face in the scene.

\* \* \* \* \*